3,134,748
POLYSTYRENE COLOR STABILIZED WITH TRI-ALKYL PHENOL AND A BENZOTRIAZOLE
Leo Costello, South Bound Brook, and Jerome L. Dunn, Somerville, N.J., assignors to American Cyanamid Company, New York, N.Y., a corporation of Maine
No Drawing. Filed Jan. 30, 1962, Ser. No. 169,942
8 Claims. (Cl. 260—45.8)

This invention relates to protecting polymeric styrene compositions against development on aging of excess coloration, particularly that produced by exposure to incident ultraviolet light. More particularly, it is concerned with a unique protective method for such compositions which method consists in disseminating therethrough a small amount of a protective composition consisting essentially of a selected minor amount of a suitable tri-alkyl phenol and a major amount of a suitable 2-(2-hydroxy-5-alkyl-phenyl)-benzotriazole.

Of the many industrially-available polymeric materials, polystyrene, due to its intrinsic structure, alone or in copolymers, has a marked tendency to exhibit yellow coloration which becomes increasingly apparent on aging. It has proved to be one of the most difficult to protect adequately against excessive discoloration, particularly that caused by ultraviolet radiation.

The protective method of the present invention is particularly well suited for this purpose. Therefore, for purposes of this discussion, polystyrene will be taken as illustrative. Accordingly, the invention still further contemplates polystyrene products protected by the addition of the protective-agent composition.

Still more specifically, the phenol derivatives used as protective agents in this invention may be represented by the type formula:

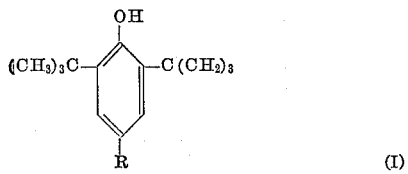

(I)

wherein R is an alkyl radical of from one to about four carbon atoms. These compounds are not new per se and have been previously known as antioxidants for oils, fats and rubber.

The substituted benzotriazoles may be represented by the formula:

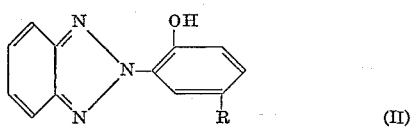

(II)

wherein R represents an alkyl radical of from one to eight carbon atoms.

Polystyrene, a well known homopolymer which may contain small quantities of lubricants and/or colorants, has been found useful in a wide variety of applications. In many of them the development of excessive yellow discoloration is undesirable. Therefore, many attempts have been made to protect polystyrene against this effect of exposure to radiation in the ultraviolet range (hereinafter abbreviated as "UV" or "UV-radiation").

Primarily, this has been attempted by incorporating therein small amounts of various known UV-absorbing compounds. Such attempts have been partially successful over relatively short periods of exposure. However, upon continued exposure, yellowing nevertheless continues to take place at an excessive rate. There still remains a need for a method whereby such yellow discoloration may be minimized.

Further description of the present invention requires some method of measuring and describing the extent of discoloration. Accordingly, for definitive purposes, the effect will be discussed herein in terms of the "yellow index" (hereinafter denoted as "Y.I."). This Y.I. is a measure of degree of yellowness obtained by substituting data measured by a spectrophotometer in the following formula:

$$Y.I. = 100\left(\frac{T'_{680} - T'_{420}}{T_{560}}\right)$$

wherein, "T" is the percent transmission of the unexposed sample at the indicated wavelength and "T'" that of the exposed sample at the indicated wavelengths.

Based thereon, the following test procedure was developed. To 100 parts of polystyrene the amount of protective material to be tested is added on a two-roll mill. One roll is maintained at 350° F., the other at 250° F. The mix is blended continuously over a ten-minute period by repeatedly passing the mix through the nip of the rolls for 70 passes. Samples of the resultant blended mix are compression molded into a 0.050" x 2" x 2" chip. Y.I. readings are taken before and after each designated exposure period in the Fade-ometer and the Y.I. is calculated according to the above-noted formula. This procedure is used in the following discussion and specific examples and in obtaining the Y.I. values noted in the following discussion.

It is also necessary to establish a measure of successful protection. In general, when the Y.I. exceeds a value of some 15–20 units, the resulting polystyrene is too yellow. It is considered unsatisfactory for many applications. A good result, which it is a principal object of the present invention to attain, is to so protect the polystyrene that maximum exposure periods are required before the Y.I. readings reach this range. Less protection than about 1000 hours to $Y.I.=15$ is not generally satisfactory. Accordingly, in the test work discussed below, unless needed for comparison, testing was stopped in most cases when a Y.I. of about 20 units was obtained.

As noted above, it has been attempted previously to obtain protection by incorporation of UV-absorbers. Some benefits were obtained, but in general the protection was not as sufficiently lasting as desired. Duration of protection can be extended somewhat by using larger amounts of the UV-absorber. However, this is not a generally satisfactory solution to the problem for several reasons.

Such attempts soon encounter certain inherent limitations. For example, many known UV-absorbers produce per se an initial yellowing effect on being added to polystyrene. There is, therefore, a definite limit on the amount which can be added before further addition thereof offsets any additional benefit of increased protection. Other known UV-absorbers seem to offer good protection during initial exposure. However, when present in useful amounts they tend to break down and thereafter seemingly produce an accelerated rate of discoloration.

There still remained, then a definite need for a method of so retarding this effect that even after prolonged exposure such yellow discoloration is minimized. Previously, such a result was not obtainable to the desired degree by addition of UV-absorbers.

A major object of this invention, therefore, is to meet this demand; to produce a marked improvement in the retardation of yellow discoloration and production of the resultant protected composition. As noted above, this has been accomplished by the use of the particular antioxidants in combination with the particular UV-absorbers of this invention, both in correct amounts.

As shown in the copending application of one of us,

Serial No. 161,258; filed December 21, 1961; a marked improvement in protection is obtained by disseminating through the polystyrene some 0.01 to 1.2 weight percent of a compound of the Formula I above. These compounds, despite the fact they have no previous history as UV-absorbers and are unique in polystyrene, produce an unexpectedly good degree of protection. Periods of some 800–900 hours to a Y.I. of about 15 units are obtainable. Nevertheless, a further increase in protection, if obtainable, is still desired. As was also pointed out therein, and in the foregoing discussion, the attempted use of UV-absorbing compounds alone for this purpose encounters definite limitations and the duration of protection remains less than that desired.

Surprisingly, in the present invention it has been found that a combination of the compounds of Formula I (above), i.e., those of the above-noted copending application, with the substituted benzotriazoles of Formula II above, has an unexpected synergistic effect on the duration of the protection. Results are obtainable which could not be obtained with either alone. In fact, the protection is far greater than could be expected from the results obtainable when each is used by itself.

As was noted above, in the protective composition of the present invention, each of the components should be used in the correct amount. In general, the phenols of Formula I (above) may be used in amounts ranging from about 0.01 to about 1.0 weight percent of the polystyrene. However, the better practice and the preferred range is from about 0.02 to about 0.5 weight percent. The benzotriazoles of Formula II (above) may be used in amounts of from about 0.05 to about 1.0 weight percent of the polystyrene. Again the preferred range is somewhat shorter, usually from about 0.1 to about 0.5 weight percent.

Within the noted broad ranges, if the minimum of each is used, the benzotriazole:phenol ratio will be 5:1 (*a*); if the maximum of each, 1:1 (*b*). If the maximum benzotriazole and minimum phenol is used, the ratio will be 50:1 (*c*). If the minimum triazole and maximum phenol is taken, the ratio would be 1:10 (*d*). Thus, from these figures alone, it might be concluded that this ratio could vary from as little as 1:10 to as high as 50:1. Thus, however, would be deceptive, the weight percentages of the preceding paragraph represent only the actual amounts which may be present.

Such a conclusion should not be made. The weight percentages given are the limits for that factor alone. In addition to the use of amounts within these limits, they should also be so selected as to maintain a proper ratio each to the other. This ratio is a further limitation in and of itself.

In general, it is better practice, as noted above, to employ a major amount of the benzotriazole and a minor amount of the phenol. Therefore, ratio (*d*) above, i.e., 1:10, will not be encountered in practice. Nor should the excess be as high as in ratio (*c*) above, i.e., 50:1.

In general, the ratio usually will be found to have as a practical upper limit about ratio (*a*) above, i.e., 5:1, although it may be increased somewhat, if so desired. As a lower limit, it will be found that it should be about ratio (*b*) above, i.e., about 1:1. Moreover, in practice it will be found in most cases that this ratio range may be shortened to from about 3.5:1 to about 1.2:1.

It will be found in many, if not most, cases that an average ratio of about 2.5:1 will constitute good practice and is usually preferable. For that reason it has been used in further discussing this invention in conjunction with the following illustrative examples. Therein, unless otherwise noted, all parts and percentages are by weight and temperatures are in degrees centigrade.

Because of their quite long chemical names, a number of the compounds used in the following examples are designated by symbols to simplify reference thereto. These numbers designate the compounds shown in the following listing:

| Compound No. | Chemical Name |
|---|---|
| A-1 | 2,6-di-t-butyl-p-cresol. |
| A-2 | 2,4,6-tri-t-butyl phenol. |
| A-3 | 2,6-t-butyl-4-ethyl phenol. |
| A-4 | 2,6-di-t-butyl-4-i-propyl phenol. |
| A-5 | 2,6-di-t-butyl-4-n-propyl phenol. |
| B-1 | 2-(2-hydroxy-5-methyl-phenyl)-benzotriazole. |
| B-2 | 2-(2-hydroxy-5-ethyl-phenyl)-benzotriazole. |
| B-3 | 2-(2-hydroxy-5-i-propyl-phenyl)-benzotriazole. |
| B-4 | 2-(2-hydroxy-5-n-butyl-phenyl)-benzotriazole. |
| B-5 | 2-(2-hydroxy-5-t-butyl-phenyl)-benzotriazole. |
| B-6 | 2-(2-hydroxy-5-t-octyl-phenyl)-benzotriazole. |

The same identification symbol refers to the same compound wherever it occurs in the following examples and discussion.

EXAMPLE 1

To illustrate the beneficial effect of the substituted phenols of the above-noted copending application of one of the present inventors, 0.1 part of the illustrative compound is mixed with 100 part samples of commercial polystyrene and the Y.I. values determined. The test procedure outlined above is used. Illustrative average results are shown in the following table.

*Table I*

| Comound No. | Initial Y.I. | Exposure Hours to Y.I. of— | | |
|---|---|---|---|---|
| | | 10 | 15 | 20 |
| None (control) | 4 | 200 | 350 | 520 |
| A-1 | 2 | 510 | 770 | 825 |
| A-2 | 3 | 650 | 825 | 955 |

Similar results are obtained substituting A-3, A-4 and A-5 as the test compound.

EXAMPLE 2

In order to demonstrate the effect of using only a benzotriazole compound of Formula II (above), Example 1 is repeated, substituting 0.25 part of B-1 for the 0.1 part per 100 of A-1. A Y.I. of 15 is reached in 740 hours.

EXAMPLE 3

Example 2 is repeated substituting 0.25 parts of B-2 for the B-1 of that example. Illustrative results are shown in the following table.

*Table II*

| Protective Compound | Y.I. after Exposure (in hours) | | | |
|---|---|---|---|---|
| | 400 | 600 | 800 | 1,000 |
| None | 22 | 35 | 48 | |
| B-2 | 7 | 9 | 18 | 35 |

Approximately the same protection is obtained as with B-1. Substantially equivalent results are obtained in repeating the example with B-3. As the alkyl of "R" in Formula II (supra) increases from about four to about eight carbons, the rate of retarding the yellowing falls off somewhat. Compounds in which the alkyl group contains above eight carbons do not appear to be desirable. The latter therefore constitute the preferred compounds and B-1 is used illustratively in the following examples.

EXAMPLE 4

Example 1 is repeated, replacing the phenols with a premixed protective composition consisting essentially of A-1 and B-1 in weight ratio of about 1:2.5. The composition is used in amount of about 0.35 part per 100 parts of polystyrene. Although a Y.I. of about 15 is reached in about 700 hours with A-1 alone and about 740 with B-1 alone, after 1200 hours the test is stopped and the Y.I. is still only 12.

EXAMPLE 5

Example 4 is repeated substituting an equal weight of A-2 for the A-1. The test is stopped after 1200 hours and the Y.I. is still only 7. Similar results are obtained in substituting A-3, A-4 and A-5 for A-1, and B-2, B-3, B-4, B-5 and B-6 for B-1.

In utilizing the present invention, it is feasible to add the two protective agents in succession on the mill or to add both separately but simultaneously. In general, however, less milling is required and generally better results are obtained if the two components of the protective compositions are precombined in a uniform mixture as in Example 4 above. Moreover, this gives a larger weight to be handled and is helpful in increasing the accuracy of measurement.

When using a precombined composition as the protective agent, its components should be within the ratio ranges indicated above and it should be used in such amount that both components are present within the indicated weight limitations.

We claim:
1. A polystyrene composition protected from developing excessive yellow coloration on extended exposure to incident ultraviolet radiation consisting essentially of homopolystyrene having dispersed substantially uniformly therethrough a sufficient amount of a protective composition comprising a first compound of the formula

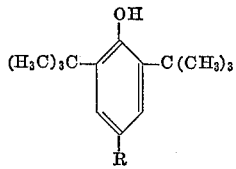

wherein R is an alkyl of from one to four carbons; and a second compound of the formula

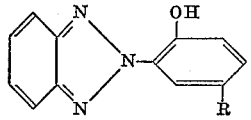

wherein R represents an alkyl of from one to eight carbon atoms; said first and second compounds being present in amount sufficient to provide from about 0.01 to about 1.0 part of said first compound and from about 0.05 to about 1.0 part of said second compound.

2. A composition according to claim 1 further characterized in that said first and second compounds are present in a weight ratio of from about 1:1 to about 1:5.

3. A composition according to claim 1 further characterized in that said first and second compounds are present respectively in from 0.02–0.5 and 0.1–0.5 part per 100 parts of polystyrene.

4. A composition according to claim 1 further characterized in that said first compound is tri-t-butyl phenol and said second compound is 2-(2-hydroxy-5-methylphenyl)-benzotriazole.

5. A composition according to claim 1 further characterized in that said first compound is tri-t-butyl phenol and said second compound is 2-(2-hydroxy-5-ethylphenyl)-benzotriazole.

6. A composition according to claim 1 further characterized in that said first compound is tri-t-butyl phenol and said second compound is 2-(2-hydroxy-5-t-octylphenyl)-benzotriazole.

7. A composition according to claim 1 further characterized in that said first compound is di-t-butyl-p-cresol and said second compound is 2-(2-hydroxy-5-methylphenyl)-benzotriazole.

8. A composition according to claim 1 further characterized in that said first compound is di-t-butyl-p-cresol and said second compound is 2-(2-hydroxy-5-ethylphenyl)-benzotriazole.

References Cited in the file of this patent
UNITED STATES PATENTS

| | | |
|---|---|---|
| 2,677,674 | Daly | May 4, 1954 |
| 3,004,896 | Heller et al. | Oct. 17, 1961 |
| 3,072,585 | Milions et al. | Jan. 8, 1963 |
| 3,074,910 | Dickson | Jan. 22, 1963 |